(12) United States Patent
Joo

(10) Patent No.: US 8,280,458 B2
(45) Date of Patent: Oct. 2, 2012

(54) MOBILE TERMINAL

(75) Inventor: Won-Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 810 days.

(21) Appl. No.: 11/779,697

(22) Filed: Jul. 18, 2007

(65) Prior Publication Data

US 2008/0085748 A1    Apr. 10, 2008

(30) Foreign Application Priority Data

Jul. 18, 2006  (KR) .................. 10-2006-0067074

(51) Int. Cl.
  *H04M 1/00* (2006.01)
  *G06F 3/033* (2006.01)
  *G06F 3/041* (2006.01)
  *G06F 3/045* (2006.01)

(52) U.S. Cl. ............ 455/575.1; 345/157; 345/159; 345/173; 345/174

(58) Field of Classification Search ........... 455/575.1, 455/186.2
See application file for complete search history.

(56) References Cited

U.S. PATENT DOCUMENTS

| 4,419,639 A  * | 12/1983 | Bauer et al. ............ 334/7 |
| 6,927,747 B2 * | 8/2005 | Amirzadeh et al. ........ 345/4 |
| 2005/0279617 A1* | 12/2005 | Han ................ 200/310 |
| 2006/0099837 A1* | 5/2006 | Cheng et al. ........... 439/131 |
| 2006/0131156 A1* | 6/2006 | Voelckers ............ 200/512 |

FOREIGN PATENT DOCUMENTS

KR    10-0570826 B1    4/2006
KR    10-2006-0081874 A    7/2006

OTHER PUBLICATIONS

Motorola v710 Owners Manual 2004 pp. 1-110.*
Motorola Press Release Jun. 30, 2005 (2 pages).*
CNET review of Motorola SLVR Apr. 26, 2006 pp. 1-15.*
History of AT&T Telephones from Wikipedia.org.*

* cited by examiner

*Primary Examiner* — Charles Appiah
*Assistant Examiner* — Joshua Schwartz
(74) *Attorney, Agent, or Firm* — Birch, Stewart, Kolasch & Birch, LLP

(57) ABSTRACT

A mobile terminal including a terminal case made of a metal material, input keys disposed in through holes formed on the terminal case, and an input pad disposed within the terminal case, to which a signal is input according to a touch operation of the input keys.

17 Claims, 4 Drawing Sheets

MOBILE TERMINAL

This application claims priority to Korean Application No. 10-2006-0067074 filed in Korea on Jul. 18, 2006, the entire contents of which is hereby incorporated in its entirety.

BACKGROUND OF THE INVENTION

1. Field of the Invention

The present invention relates to a mobile terminal, and more particularly, to a mobile terminal with a case made of a metallic material and a touch type input device.

2. Description of the Related Art

Mobile terminals include a touch type input device having a plurality of keys that the user touches to input information into the terminal. The touch type input device is generally a capacitance type touch input device in which a capacitance changes when the user touches a particular key. The touched key then generates a signal that is sent to a circuit board included in the terminal and appropriately processed.

However, because the type touch input device is based on the capacitance method, the touch keys need to be placed a certain distance between each other so the capacitance of one key does not affect another key. Therefore, the area required for forming the touch keys increases, which leads to an increase in the size of the terminal. In addition, because the touch input device is baaed on the capacitance method, the terminal case surrounding the touch key input device is made of a plastic material. Therefore, because the terminal case is made of plastic, the strength is not as strong and the thickness of the terminal is increased.

BRIEF DESCRIPTION OF THE INVENTION

Accordingly, one object of the present invention is to address the above-noted and other problems.

Another object of the present invention is to provide a mobile terminal including a metal case having touch sensitive input functions.

Yet another object of the present invention is to provide a more compact mobile terminal.

To achieve these and other advantages and in accordance with the purpose of the present invention, as embodied and broadly described herein, the present invention provides in one aspect a mobile terminal including a terminal case made of a metal material, input keys disposed in through holes formed on the terminal case, and an input pad disposed within the terminal case, to which a signal is input according to a touch operation of the input keys.

In another aspect, the present invention provides a mobile terminal including a display configured to display information, an input device configured to input information into the mobile terminal, and a metal case surrounding at least the input device of the mobile terminal. Further, the input device includes input keys disposed in through holes in the metal case and a plurality of input display units associated with the input keys, and the plurality of input display units are configured to display information to be input when the corresponding input key is selected.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
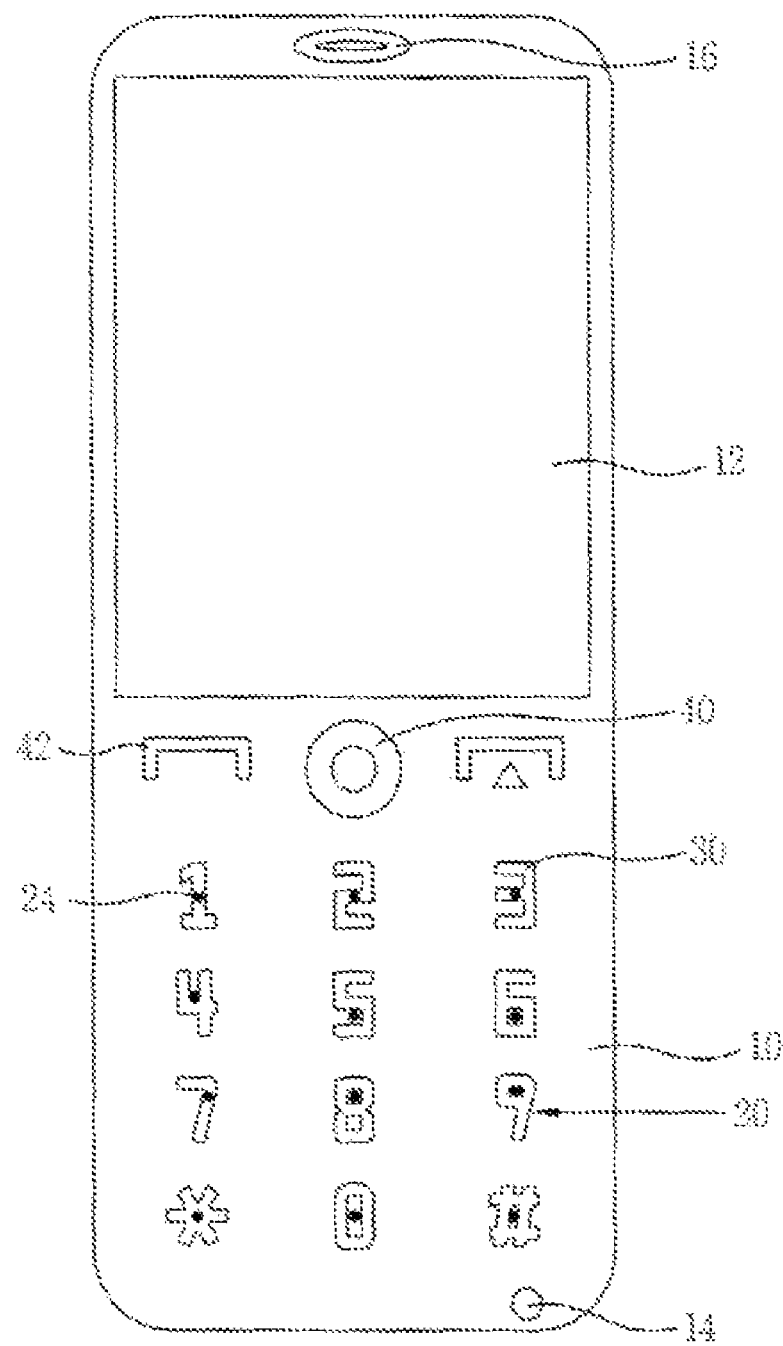
FIG. 1 is a front view of a mobile terminal according to one embodiment of the present invention.

FIG. 1 is a front view of a mobile terminal according to one embodiment of the present invention. As shown, the mobile terminal includes a terminal case 10, a display 12 mounted on the terminal case 10 and for displaying information, and an input device 20 installed on the terminal case 10 and for inputting information. Further, FIG. 1 illustrates a bar type mobile terminal, but the present invention is also directed to any other type of mobile terminal such as a folder type, a slide type and a swing type mobile terminal.

In addition, the mobile terminal also includes a microphone 16 installed at one end of the terminal case 10, and a speaker 14 installed at the other end of the terminal case 10. A direction key 40 and a menu key 42 are also installed on the terminal case 10. The terminal also includes a plurality of input display units 30 having various shapes such as numbers, characters, symbols, figures, etc. formed on the terminal case 10. Further, the input display units 30 can be formed to penetrate the terminal case 10, to penetrate the terminal case 10 and be filled with a transparent material for illumination, or be engraved on the surface of the case 10.

Also, as shown in FIG. 1, the input device 20 includes the menu key 42, the direction key 40 and the input display units 30. Further, because the input display units 30 are formed to penetrate the terminal body or to be engraved markings, the input display units 30 are integrated together with the terminal case 10, and do not directly perform an input function. Rather, the input display units 30 merely represent to a user the different numbers, symbols, etc. Thus, because the input display units do not directly perform an input function, the input device 20 also includes input keys 24 associated with each of the numbers, symbols, etc. corresponding to the input display units 30.

Figure 2:
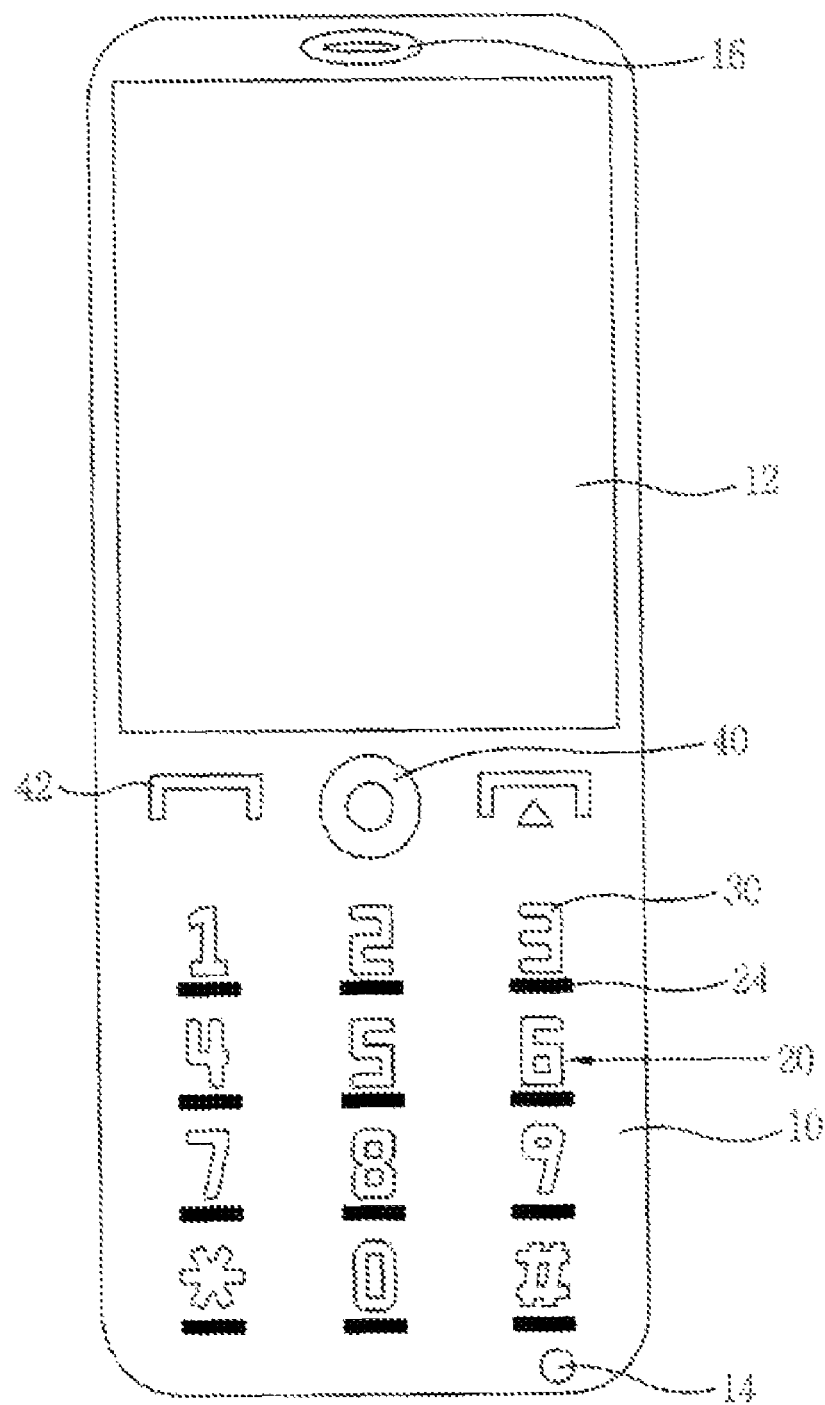
FIG. 2 is a front view of a mobile terminal according to another embodiment of the present invention.

Note that FIG. 2 is similar to FIG. 1, except that the input keys 24 are not positioned within each input display unit as in FIG. 1. Rather, the input keys 24 are placed below and separate from the corresponding input display units 30. Therefore, in FIG. 2, if a user touches only the input display units 30 without touching the corresponding input keys 24, no signal would be input into the terminal. That is, the input display units 30 are an integral part of the terminal case 10 and provide a way to visually represent to a user a particular function or value that is input to the terminal when the corresponding input key 24 is pressed.

For example, the input display units 30 can be carved out of the terminal case 10 (i.e., penetrated through the terminal case 1), may be engraved on the terminal case 10, may be painted on the terminal case 10, etc. Further, according to embodiments of the present invention, the input keys 24 can be positioned in various ways with the corresponding input display units 30.

Figure 3:
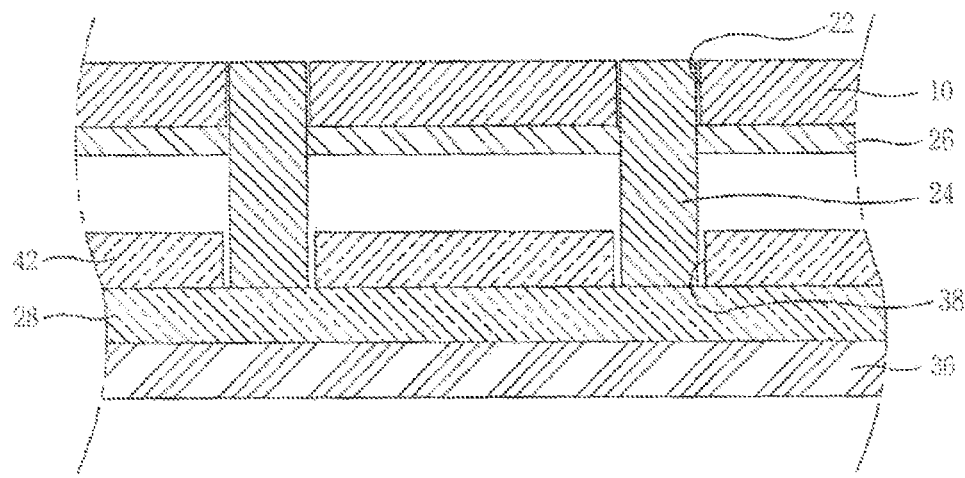
FIG. 3 is a sectional view of an input device according to a first embodiment of the present invention.

FIG. 3 is a sectional view of the input device according to a first embodiment of the present invention. As shown in FIG. 3, the input device includes the input keys 24 movably mounted in through holes 22 formed through the terminal case 10, an elastic support pad 26 installed on an inner surface of the terminal case 10 and for elastically supporting the input keys 24, and an input pad 28 installed within the terminal case 10, to which a signal is input when the input keys 24 are touched.

In addition, as shown in FIG. 3, the input device also includes an illumination sheet 42 that is used to illuminate the input display units 30. Preferably, the illumination sheet 42 is formed as an electroluminescence (EL) sheet. The EL sheet uses a phenomenon that electrons accelerated by a high electric field collide with light emitting electrodes included in a fluorescent layer so as to be excited, and the excited electrons become energy when returning to a stable state, thus emitting light. Different colors may also be emitted for different input display units 30.

In addition, the input keys 24 are preferably made of a silicon material and inserted into the through holes 22 formed on the metal case 10 and through holes 38 formed in the illumination sheet 42 such that they can be pressed up and down. Further, the through holes 22 may be formed by etching the case 10 and the through holes 38 in the illumination sheet 42 may be formed using a mask or any other suitable method. The silicon input keys 24 can then be inserted into the through holes 22 and 42 so as to contact the input pad 28.

That is, as shown in FIG. 3, the input keys 24 are made of a transparent silicon material and an upper side of the input keys 24 corresponds to the surface of the case 10, and a lower side of the input keys 24 vertically extends from the lower surface of the case 10 and contacts the surface of the input pad 28. Further, the elastic support pad 26 is preferably made of a material with a certain elastic force to allow the input keys 24 to be returned to their original state after being pressed.

As shown in FIG. 3, the elastic support pad 26 is positioned on an inner side of the case 10 and is fixed at an outer circumferential surface of the input keys 24. In addition, the input pad 28 is fixed on the upper surface of the circuit board 36 through a bonding method or other suitable method. Also, when the input keys 24 are touched, the input pad 28 is pressed and therefore a signal is input to the input pad 28.

Further, the input pad 28 is preferably formed as an FSR (Force Sensing Resistor™) sensor, which is a sensor whose resistance changes according to a vertically pressing force. Thus, the resistance of the FSR sensor changes in accordance with a force pressing the input keys 24 and a signal is created.

In addition, because the input keys 24 are transparent, they are illuminated by light emitted from the EL sheet 42. Different colors may also be emitted by the illumination sheet 42 or color filters may be used such that different input keys 30 can be illuminated with different colors.

In addition, as discussed above, the terminal case 10 is made of a metallic material such as a steal material. The terminal case 10 is preferably made of a stainless steel material. Thus, because the terminal case 10 is made of the steel material, the strength of the terminal case 10 is increased while at the same time the thickness of the terminal case 10 is reduced. Further, the input display units 30 can be engraved on the surface of the case 10 or penetratingly formed on the case 10 and filled with a transparent material. Therefore, the design forms of the terminal case are diverse.

The operation of the input device of the mobile terminal according to the first embodiment of the present invention will now be described.

When one of the input keys 24 is touched, the touched input key 24 is pressed against the input pad 28 through the through holes 22 and 38. Thus, the input pad 28 sends an appropriate signal to the circuit board 36. In addition, because the terminal case 10 is made of a metal material, and in particular a steel material, the metal terminal case 10 does not bend or change shape when the input keys 24 are pressed.

Further, as mentioned above, the input keys 24 are illuminated by the light emitted from the illumination sheet 42. Thus, the user can easily see what portion of the input device 20 to press. For example, in the embodiment shown in FIG. 1, the user can easily see that the input keys 24 are contained within the input display units 30. Further, in the embodiment shown in FIG. 2, the user can easily see that the input keys 24 are located below the input display units 30. In addition, other arrangements of the touch input keys 24 with respect to the input display units 30 may be used, as long as the user is able to easily determine which touch input key 24 is associated with which input display unit 30.

In addition, because the input pad 24 is formed as the FSR sensor, the resistance changes as the input key 24 is pressed and the changed resistance is transferred to the circuit board 36. Further, when the pressed input key 24 is released, the input key 24 is returned to its original state because of the elastic force of the elastic support pad 26 positioned at the lower surface of the terminal case 10. Therefore, the user can enter a phone number or other information into the terminal by pressing the appropriate input keys 24.

In addition, because the terminal case 10 is made of the metal material, and in particular, a steel material, the mobile terminal can be made to have a thin shape, while at the same time increasing the overall strength of the mobile terminal. This is particularly advantageous because mobile terminals are often dropped. With the present invention, however, the terminal case is made with a metal case that can withstand the impact of being dropped better than a non-metal terminal case.

Further, because the input display unit 30 can be shaped in various forms on the surface of the terminal case 10, various designs can be implemented. Also, because a separate part does not have to be formed between keys, the design of the mobile terminal is slim and sleek. In addition, because the input pad 28 is formed using the FSR sensor, signals can be input to the input pad 28 according to a change in pressure. Therefore, the spaces between input keys can be reduced, and the terminal case 10 can be made more compact.

Figure 4:
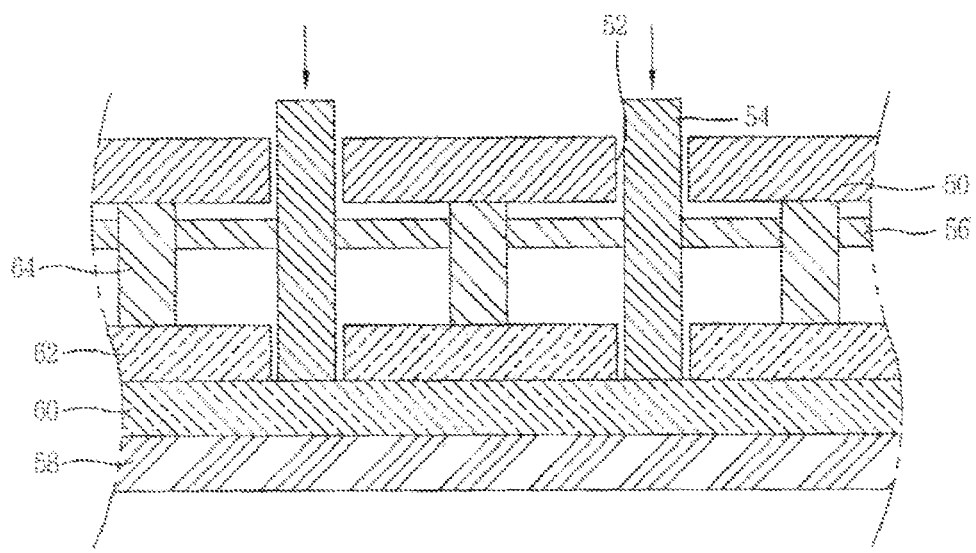
FIG. 4 is a sectional view of an input device according to a second embodiment of the present invention.

FIG. 4 is a sectional view of an input device according to a second embodiment of the present invention. As shown, the input device includes input keys 54 inserted to be movable up and down in key mounting holes 52 formed at a terminal case 50, and an elastic support pad 56 mounted within the case 50. That is, the elastic support pad 56 elastically supports the input keys 54.

Also included is an input pad 60 mounted on an upper surface of a circuit board 58 installed within the case 50. The input pad 60 outputs a signal to the circuit board 58 when the keys 54 are pressed. FIG. 4 also illustrates an illumination sheet 62 attached on an upper surface of the input pad 60. Similar to the first embodiment the illumination sheet 62 illuminates the input keys 54.

In addition, in this second embodiment the case 50 is made of a metallic material such as an aluminum material. Further, support legs 64 are used to for maintaining a certain space between the case 50 and the illumination sheet 62. As shown in FIG. 4, the support legs 64 are formed at certain intervals, at a lower surface thereof of the case 50, and lower ends of the support legs 64 contact with the upper surface of the illumination sheet 62.

Further, the elastic support pad 56 is fixed at outer circumferential surfaces of each of the input keys 54 and the support legs 64. Thus, the elastic support pad 56 elastically supports the keys 54. In addition, as shown in FIG. 4, a certain gap is maintained between the elastic support pad 56 and the rear surface of the case 50. Also, similar to the first embodiment, the input keys 54 are made of a transparent material so they are illuminated by light emitting from the illumination sheet 62.

In addition, the outer circumferential surface of the input keys 54 are connected with the elastic support pad 56 so as to be elastically supported. As shown, each of the upper ends of the input keys 54 is protruded with such a height so as to be pressed from the surface of the case 50, and each of the lower ends of the input keys 54 contacts with the input pad 60. Therefore, because the input keys 54 protrude from the surface of the terminal case 50, the input keys 54 do not contact the terminal case 50 when they are pressed, so the terminal case 60 made of the aluminum material is not deformed when the input keys 54 are pressed.

Further, because the input pad 60 and the illumination sheet 62 have the same structure as the input pad 36 and the illumination sheet 42 described in the first embodiment of the present invention, a detailed description of these elements is not repeated here.

An operation of the input device according to the second embodiment of the present invention will now be described.

First, when the input keys 54 are pressed, the input keys 54 are pressed against the input pad 60. Then, the resistance of the pressed portion of the input pad 60 changes and a corresponding signal is input to the circuit board 58. In this instance, because the input keys 54 protrude from the surface of the terminal case 50, the terminal case 50 is not deformed by a force pressing the input keys 54. In addition, when the keys 54 are released, the keys 54 are returned to their original state due to the elastic force of the elastic support pad 56. In addition, similar to the first embodiment, the keys 54 are illuminated by light emitted from the illumination sheet 62.

Figure 5:
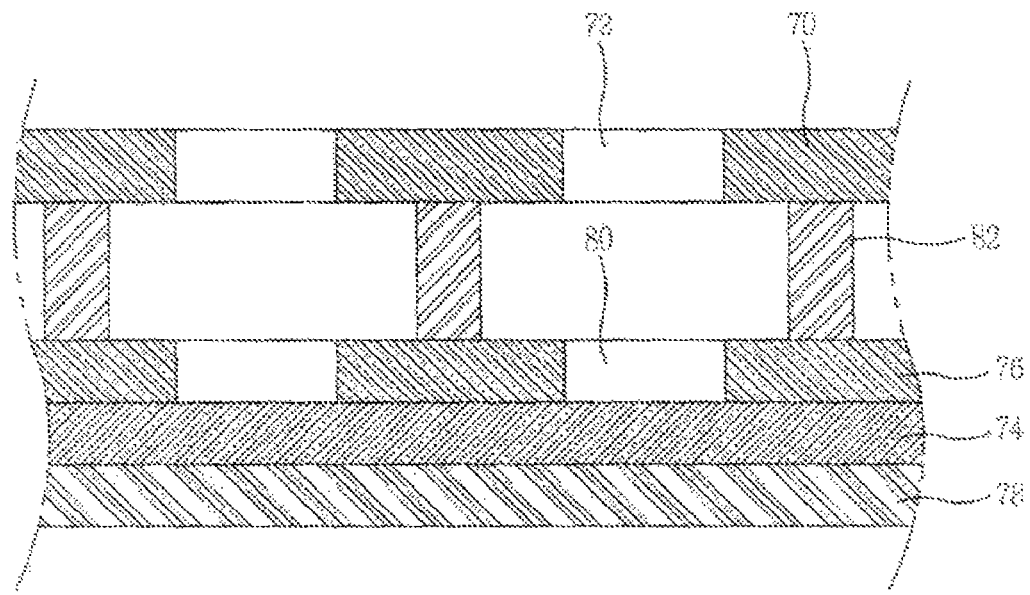
FIG. 5 is a sectional view of an input device according to a third embodiment of the present invention.

FIG. 5 is a sectional view of an input device according to a third embodiment of the present invention. As shown, the input device includes a terminal case 70 made of a metallic material, touch keys 72 that are formed to penetrate the terminal case 70, a touch pad 74 disposed within the terminal case 70 and on an upper surface of a circuit board 78. Further, the touch pad 74 outputs a signal to the circuit board 78 according to a capacitance method when the touch keys 72 are touched.

FIG. 5 also illustrates an illumination sheet 76 attached on an upper surface of the touch pad 74. Similar to the first and second embodiments, the illumination sheet 76 is used to illuminate the touch keys 72. In addition, the terminal case 70 is made of a steel material or an aluminum material.

The touch keys 72 are formed as a number, a symbol, a figure, a character, etc. so as to penetrate the metal case 70. A transparent material that increases a capacitance response can also be filled in penetrating touch keys 72 such that when the touch keys 72 are pressed, the capacitance of the touch is transferred to the touch pads 74. That is, the embodiment in FIG. 5 is directed to touch capacitance type method.

Also, the illumination sheet 76 is preferably formed as an EL sheet, and passages 80 are provided at the illumination sheet 76 through which a signal according the capacitance method can be transferred to the touch pads 75. As shown in FIG. 5, support legs 82 are also installed between the lower surface of the terminal case 70 and the illumination sheet 76 so as to maintain a space between the illumination sheet 76 and the lower surface of the terminal case 70.

An operation of the input device according to the third embodiment of the present invention will now be described. When the touch keys 72 are touched by a user, because the touch keys 72 are formed to penetrate the terminal case 70, the influence of capacitance is transferred through the penetrating portion to the touch pad 74 to thereby input a signal.

Further, in the above-described embodiments, the terminal case is made of metal material. Because the terminal case is made of metal material, the input units of the mobile terminal can be etched into the metal terminal. Alternatively, the shape of the input units such as letters, numbers, symbols, etc. may be cut out of the metal material such that the input units penetrate the metal casing. For example, with reference to FIGS. 1 and 2, the number "5" input unit may be etched into the metal material or may be cut out of the metal material in the shape of a "5". The input keys 24 for selecting the input units 30 are then placed near or within the input units 30 so the user can easily determine which input key 24 to press to input the number or function associated with the corresponding input unit 30. In FIG. 5, the touch keys are self-contained touch keys that can be directly touched to input a corresponding signal to the circuit board 78 (via the touch pad 74).

In addition, as described above, the mobile terminal includes a metal casing. However, it is also possible to provide the input device 20 (see FIG. 1) with a metal casing or cover such that the input keys, etc. can be etched or carved out of the metal material. The other portions of the terminal may be formed with a different material.

As so far described, the mobile terminal according to the present invention has several advantages.

That is, because the terminal case of made of a metallic material, the mobile terminal can be formed thin and the strength of the mobile terminal can be increased. In addition, because the input display units on the surface of the terminal case can be shaped in various forms, its design can be variably implemented. Also, because a separation part is not needed between keys, the design of the mobile terminal can be sleeker. The spaces between the keys can also be reduced, thereby making the mobile terminal even more compact.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:
1. A mobile terminal, comprising:
a terminal case made of a metal material;
input keys disposed in through holes formed on the terminal case, each input key being a single body of substantially transparent material;

an elastic support pad within the terminal case and configured to elastically support the input keys such that the input keys are returned to an initial state after being pressed;

an input pad disposed within the terminal case, to which a signal is generated according to a touch operation of the input keys;

a plurality of visual markers associated with the input keys and being etched or engraved on the terminal case, each visual marker being shaped to denote a type of user input;

transparent silicon material inserted at the etched or engraved portions for the visual markers; and a circuit board including circuits configured to perform functions corresponding to selected input keys, wherein the input pad comprises a plurality of sensors or a touch capacitance type pad attached on a surface of the circuit board, said sensors or said touch capacitance type pad configured to generate a signal when the input keys are touched, and wherein upper surfaces of the input keys are substantially flush with an upper surface of the terminal case and lower surfaces of the input keys contact the input pad.

2. The terminal of claim 1, wherein the metal material is at least one of a steel material and an aluminum material.

3. The terminal of claim 1, wherein the plurality of visual markers are exposed or protrude from the terminal case.

4. The terminal of claim 1, wherein the input keys are positioned within or separate from corresponding visual markers.

5. The terminal of claim 1, wherein the input keys and the plurality of visual markers are surrounded by the metal material of the terminal case.

6. The terminal of claim 1, wherein the plurality of visual markers comprises one of a number, a symbol, a character and a figure.

7. The terminal of claim 1, wherein the input keys are disposed to be operatively moveable in the through holes of the terminal case.

8. The terminal of claim 1, further comprising:
an illumination sheet attached on an upper surface of the input pad and configured to illuminate the input keys.

9. The terminal of claim 8, wherein the illumination sheet is an electroluminescence (EL) sheet.

10. The terminal of claim 8, further comprising;
support legs disposed between the illumination sheet and an inner surface of the terminal case and configured to maintain a predetermined distance between the terminal case and the illumination sheet.

11. A mobile terminal, comprising:
a display screen configured to display information;
an input device configured to input information into the mobile terminal;
a metal case surrounding at least the input device of the mobile terminal; and
an elastic support layer attached to a lower surface of the metal case to provide structural support for the input device,
wherein the metal case is made of at least one of a steel material and an aluminum material,
wherein the input device includes input keys disposed in through holes in the metal case and a plurality of visible indicators associated with the input keys, said plurality of visible indicators being shaped to indicate a type of user input,
wherein the input device comprises a pressure type input device configured to input information into the mobile terminal when pressed, or a touch type input device configured to input information into the mobile terminal when touched,
wherein the input keys are made of a soft flexible material that accommodates illumination and allows detection of physical contact being applied thereon or removed therefrom without deformation being created at the metal case surrounding at least the input device during said physical contact, and
wherein the plurality of visible indicators are formed of etched or cut-out portions of the metal case.

12. An electronic device comprising:
a metallic body having a user interface surface with a plurality of indications formed thereon, each indication denoting one or more types of user inputs;
an input layer underneath the user interface surface to detect user inputs being applied at the user interface surface;
an illumination layer made of electroluminescence material between the user interface surface and the input layer to provide illumination to the user interface surface; and
an array of input key elements located between the user interface surface and the input layer, each input key element being a single body of substantially transparent material having an upper end that is exposed from the user interface surface via a respective opening at the metallic body and having a lower end that operatively contacts with the input layer to activate or deactivate certain operational functions based on changes in pressure, electrical resistance or capacitance detected by the input layer due to physical contact being applied on or removed from the upper end of the input key element,
wherein the key input element is made of a silicon-like material that accommodates illumination and allows detection of physical contact being applied on or removed from the upper end of key input element with minimal deformation being created at the corresponding indication formed on the user interface surface of the metallic body during said physical contact;
an elastic support layer attached to a lower surface of the metallic body and located above the illumination layer, the elastic support layer configured to provide structural support for the user interface surface on the metallic body; and
a plurality of support legs attached to a lower surface of the metallic body and configured to provide structural support for the user interface surface on the metallic body.

13. The device of claim 12, wherein at least one key input element is located at a relatively central portion of its corresponding indication formed on the user interface surface.

14. The device of claim 13, wherein each of the plurality of indications is formed on the upper end of its respective key input element.

15. The device of claim 12, wherein the indications formed on the user interface surface are a result of etching or engraving particular surface portions on the metallic body.

16. The device of claim 15, wherein at least one key input element is located adjacently planar to its corresponding indication formed on the user interface surface.

17. The device of claim 15, wherein at least one key input element is located at a relatively central portion under its corresponding indication formed on the user interface surface.

* * * * *